United States Patent
Epshetsky

(10) Patent No.: US 9,228,659 B2
(45) Date of Patent: Jan. 5, 2016

(54) SEAL WITH REPLACEABLE LIP

(71) Applicant: Aktiebolaget SKF, Gothenburg (SE)

(72) Inventor: Yefim Epshetsky, Schaumburg, IL (US)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 13/906,665

(22) Filed: May 31, 2013

(65) Prior Publication Data

US 2014/0353924 A1    Dec. 4, 2014

(51) Int. Cl.
*F16J 15/32*    (2006.01)

(52) U.S. Cl.
CPC ............ *F16J 15/3208* (2013.01); *F16J 15/328* (2013.01); *F16J 15/3268* (2013.01); *Y10T 29/4973* (2015.01)

(58) Field of Classification Search
CPC . F16J 15/3232; F16J 15/3236; F16J 15/3268; F16J 15/3208; F16J 15/328; Y10T 29/4973
USPC ......... 277/551, 353, 438, 439, 575, 576, 577, 277/572, 571, 634, 635, 636
See application file for complete search history.

(56) References Cited

U.S. PATENT DOCUMENTS

| 3,156,474 | A  | * | 11/1964 | Nelson ........................... | 277/571 |
| 3,743,305 | A  | * | 7/1973  | Berens et al. .................. | 277/574 |
| 4,102,538 | A  | * | 7/1978  | Bertin ............................ | 277/565 |
| 5,176,576 | A  | * | 1/1993  | Moulindt ....................... | 464/111 |
| 6,083,109 | A  | * | 7/2000  | Gerulski ........................ | 464/175 |
| 6,161,838 | A  | * | 12/2000 | Balsells ......................... | 277/511 |
| 6,264,205 | B1 | * | 7/2001  | Balsells ......................... | 277/551 |
| 6,357,757 | B1 | * | 3/2002  | Hibbler et al. ................ | 277/551 |
| 8,544,850 | B2 | * | 10/2013 | Balsells et al. ................ | 277/551 |
| 2010/0237566 | A1 | * | 9/2010 | Balsells et al. ................ | 277/550 |

* cited by examiner

*Primary Examiner* — Kristina Fulton
*Assistant Examiner* — Nathan Cumar
(74) *Attorney, Agent, or Firm* — Joseph E. Maenner; Maenner & Associates, LLC

(57) ABSTRACT

In described embodiments, a seal assembly is provided for sealing a space between a shaft and a housing. The shaft is rotatable about a central axis. The seal assembly includes an outer portion connectable with the housing and an inner portion releasably attached to the outer portion. The inner portion is replaceable with a replacement inner portion. A method for removing the inner portion from the outer portion is also provided.

12 Claims, 2 Drawing Sheets

SEAL WITH REPLACEABLE LIP

BACKGROUND OF THE INVENTION

1. Field of the Invention

The present invention relates to seals, and more particularly to radial seals for sealing a space about the rotatable shaft.

2. Description of the Related Art

Radial shaft seals are generally known and typically include a seal member with an inner circumferential "sealing surface", which may be provided by an annular lip or a cylindrical portion of the seal body, that is engageable with the exterior surface of a shaft. As the shaft rotates within the seal, the sealing surface remains in sliding contact with the shaft outer surface to prevent the migration of substances (e.g., oil, debris particles) through a sealed space.

As a result of use, however, the sealing surface eventually wears, resulting in the replacement of the entire shaft seal. Seal replacement can be a time-consuming and costly task, requiring the shaft around which the seal operates to be shut down for an extended period of time while the old seal is removed and the new seal is installed. It would be beneficial to have a seal that provides the ability to replace only the sealing lip, thereby reducing the time and expense for such maintenance.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a seal assembly for sealing a space between a shaft and a housing. The seal assembly comprises an outer portion connectable with the housing and an inner portion releasably attached to the outer portion.

In another embodiment, a seal assembly further includes an outer portion connectable with the housing. The outer portion has a free end. An inner portion is releasably attached to the outer portion. The inner portion has an annular groove sized to releasably accept the free and of the outer portion inserted thereinto.

Further, a method of removing an inner portion of a seal assembly from an outer portion of the seal assembly comprises the steps of providing the seal assembly disclosed above; removing a biasing member; and removing the inner portion from the outer portion.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
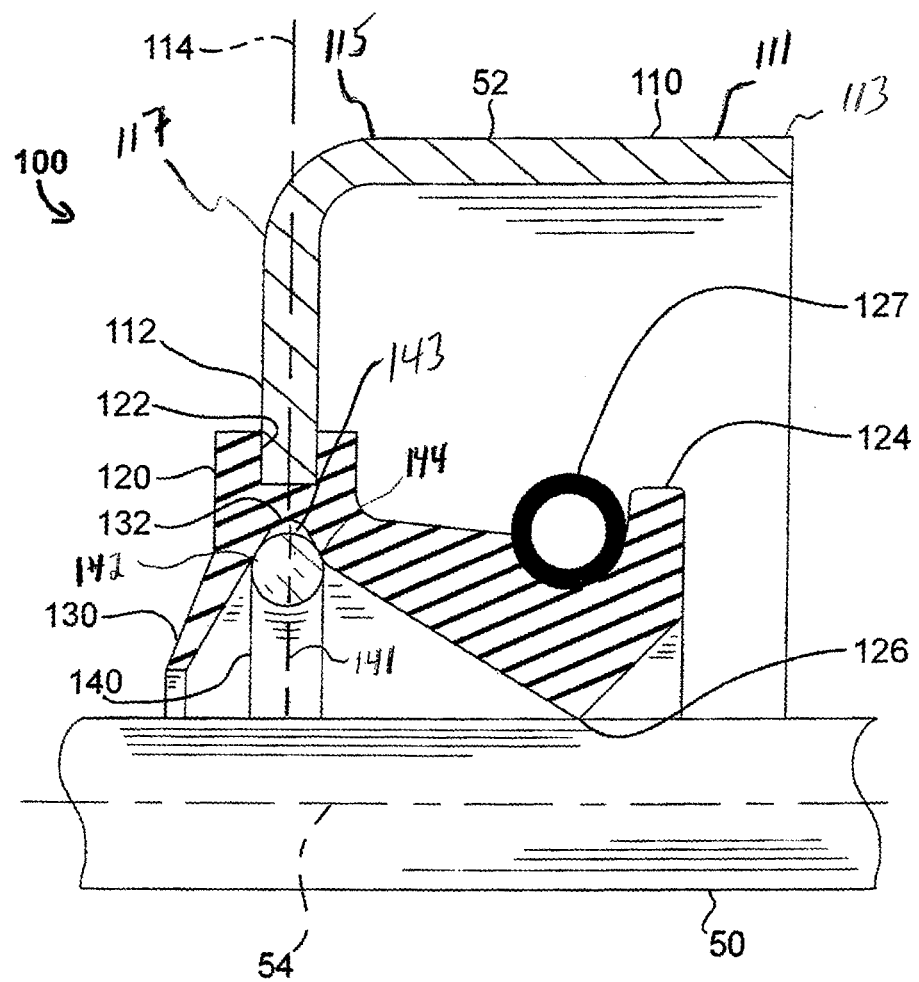
FIG. 1 shows a side elevational view, partially in section, of a seal assembly according to a first exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

As used in this application, the term "radially inwardly" is used herein to mean a direction toward a shaft that is being sealed by the inventive seal assembly. Similarly, the term "radially outwardly" is used herein to mean a direction away from the shaft that is being sealed by the inventive seal assembly.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Referring to FIG. 1, a seal assembly 100 according to a first exemplary embodiment of the present invention is shown. Seal assembly 100 is used for sealing a space between a shaft 50 and a housing 52. Seal assembly 100 circumferentially surrounds shaft 50 and is co-axial with a shaft centerline 54.

For ease of view, only shaft 50 and a portion of seal assembly 100 that extends above shaft 50 as shown in FIG. 1 is shown. Seal assembly 100 is shown in cross-section, while shaft 50 and housing 52 are not.

Seal assembly 100 includes an outer portion 110 that is connectable with housing 52. Outer portion 110 has an axial portion 111 having a first end 113 and a second end 115. Outer portion 110 also has a free and or, radial portion, 112 that is used to receive and retain an inner portion 120. Free end 112 extends along a free end, or radial, axis 114 perpendicular to longitudinal axis 54. A connected end 117 is connected to second end 115 of axial portion 111. Outer portion 110 may be constructed from metal or other rigid material.

Seal assembly 100 also includes a lip, or elastic inner portion 120, that is releasably attached to outer portion 110. Inner portion 120 has a groove 122 sized to releasably accept free end 112 of outer portion 110 inserted thereinto. Free end 112 of outer portion 110 may be retained inside groove 122 by friction. Elastic inner portion 120 may be constructed from an elastomer or other flexible material.

Inner portion 120 also has a sealing portion 124 that includes a contact point 126. Contact point 126 is disposed away from free end 112 of outer portion 110. Contact point 126 engages shaft 50 and forms the seal between seal assembly 100 and shaft 50. A garter spring 127 biases contact point 126 against shaft 50. Inner portion 120 also includes a dirt lip 130 proximate to free end 112 of outer portion 110. A retaining channel 132 is disposed between dirt lip 130 and sealing portion 124. Retaining channel 132 extends along free end axis 114.

An annular ring 140 is disposed in retaining channel 132 between dirt lip 130 and contact portion 126 such that annular ring 140 retains inner portion 120 onto outer portion 110. Annular ring 140 engages retaining channel 132 along only a first wall 142 having a linear axial cross-section, and a second wall 144 having a linear cross-section, with walls 142, 144 each extending circumferentially around ring 140. A gap 143 is present between annular ring 140 and inner portion 120 along radial axis 114. Annular ring 140 may be a biasing member, such as a spring, that is biased radially outwardly from shaft 50 such that annular ring 140 biases inner portion 120 toward and onto outer portion 110. Annular ring 140 has an axis 141 that is axially aligned with and extends along radial axis 114.

As shaft contact surface 126 is worn down as a result of friction between shaft contact surface 126 and shaft 50, the effectiveness of sealing assembly 100 is reduced, requiring inner portion 120 to be removed from outer portion 110 and replaced with a new inner portion (not shown). Because inner portion 120 is releasably attached to outer portion 110, inner portion 120 is easily removed from outer portion 110 and replaced with the new inner portion.

Figure 2:
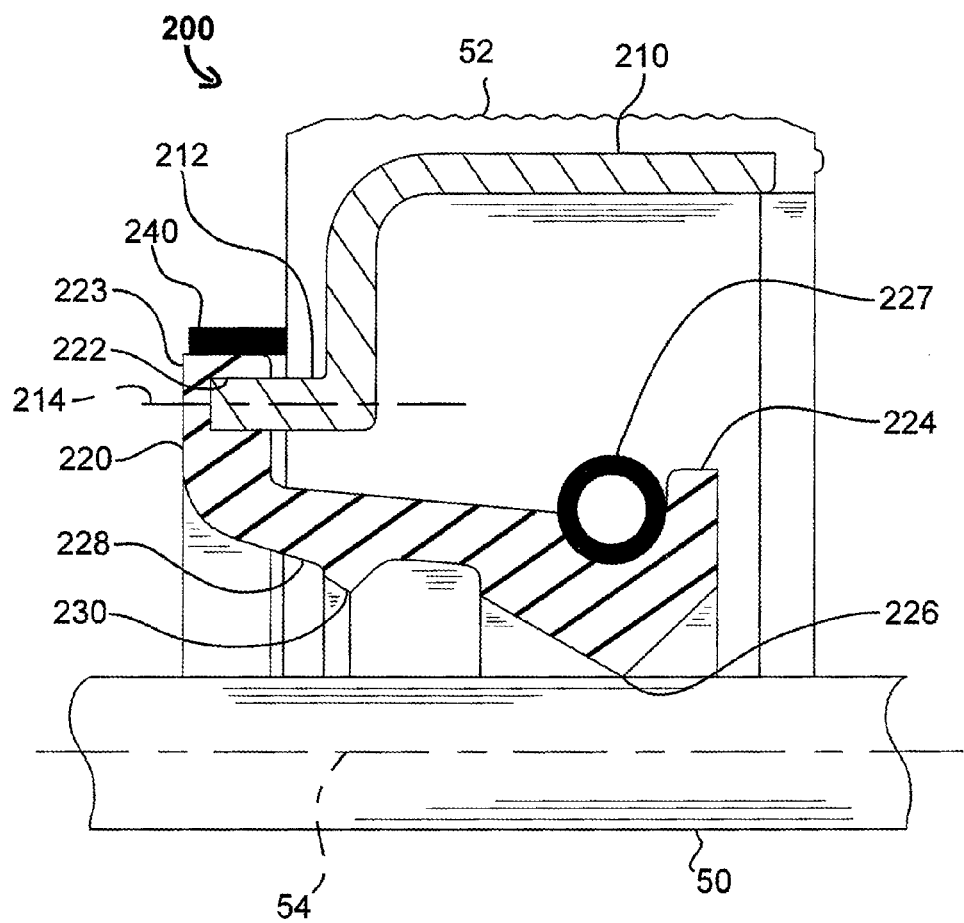
FIG. 2 shows a side elevational view, partially in section, of a seal assembly according to a second exemplary embodiment of the present invention.

Referring now to FIG. 2, a seal assembly 200 according to a second exemplary embodiment of the present invention is shown. Similar to seal assembly 100, seal assembly 200 is used for sealing a space between shaft 50 and housing 52. Seal assembly 200 circumferentially surrounds shaft 50 and is co-axial with a shaft centerline 54.

For ease of view, only shaft 50 and a portion of seal assembly 200 that extends above shaft 50 as shown in FIG. 2 is shown. Seal assembly 200 is shown in cross-section, while shaft 50 and housing 52 are not.

Seal assembly 200 includes an outer portion 210 that is connectable with housing 52. Outer portion 210 includes a free end 212 that is used to receive and retain a seal inner portion 220. Unlike free end 112 of outer portion 110, which extends along free axis 114 perpendicular to longitudinal axis 54 of shaft 50, free end 212 of outer portion 210 extends along a free end axis 214 parallel to longitudinal axis 54 of shaft 50. Outer portion 210 may be constructed from metal or other rigid material.

Seal assembly 100 also includes a lip, or elastic inner portion 220, that is releasably attached to outer portion 210. Inner portion 220 has a groove 222 sized to releasably accept free end 212 of outer portion 210 inserted thereinto. Free end 212 of outer portion 210 may be retained inside groove 222 by friction. An outer edge 223 of groove 222 extends radially outwardly from free end 212 of outer portion 210. Inner portion 220 may be constructed from an elastomer or other flexible material.

Inner portion 220 also has a sealing portion 224 that includes a contact point 226. Contact point 226 is disposed away from free end 212 of outer portion 210. Contact point 226 engages shaft 50 and forms the seal between seal assembly 200 and shaft 50. A garter spring 227 biases contact point 226 against shaft 50. Inner portion 220 also includes an outer portion 228 proximate to free end 212 of outer portion 210. Outer portion 228 includes a dirt lip 230.

An annular ring 240 extends around and engages outer edge 223 of groove 222 such that annular ring 240 retains inner portion 220 onto outer portion 210. Annular ring 240 may be a biasing member, such as a spring or elastic band, that is biased radially inwardly toward shaft 50 such that annular ring 240 biases inner portion 220 toward and onto outer portion 210. Annular ring 240 is located such that dirt lip 230 is disposed between annular ring 240 and contact point 226.

Similar to seal assembly 100, as shaft contact surface 226 is worn down as a result of friction between shaft contact surface 226 and shaft 50, the effectiveness of sealing assembly 200 is reduced, requiring inner portion 220 to be removed from outer portion 210 and replaced with a new inner portion (not shown). Because inner portion 220 is releasably attached to outer portion 210, inner portion 220 is easily removed from outer portion 210 and replaced with the new inner portion.

The removal and replacement of either inner portion 120 or seal inner portion 220 is similar, and an exemplary method of doing so is provided below, with the descriptions of the two embodiments delineated by their respective element numbers.

To remove either inner portion 120 or inner portion 220, the respective biasing member 140, 240 is removed from inner portion 120, 220. Free end 112, 212 is removed from groove 122, 222 of outer portion 110, 210. Due to the elastic nature of inner portion 120, 220, inner portion 120, 220, and particularly, inner portion 120, 220 around the respective groove 122, 222, can be bent to facilitate its removal from outer portion 110, 210.

Next, inner portion 120, 220 is slid along shaft 50 and removed from shaft 50. A replacement inner portion (not shown), similar to either inner portion 120 or 220 that was just removed from shaft 50, is slid along shaft 50. Free end 112, 212 of outer portion 110, 210 is inserted into the replacement groove 122, 222. Then, biasing member 140, 240 is replaced to bias the replacement inner portion 120, 220 against free end 112, 212 of outer portion 110, 210.

It will be further understood that various changes in the details, materials, and arrangements of the parts which have been described and illustrated in order to explain the nature of this invention may be made by those skilled in the art without departing from the scope of the invention as expressed in the following claims.

What is claimed is:
1. A seal and shaft assembly, the seal disposed around the shaft, the seal and shaft assembly comprising:
   the shaft;
   the seal comprising:
      an outer portion having:
         an axial portion, the axial portion having a first end and a second end; and
         a radial portion extending radially inwardly, the radial portion having:
            a connected end extending radially from the first end of the axial portion;

a free end located distal from the connected end; and a radial axis extending along a portion of the radial portion;

an inner portion having:
a sealing portion engaging the shaft;
a dirt lip engaging the shaft;
a groove formed between the sealing portion and the dirt lip, the groove sized such that the free end is releasably insertable therein, wherein the inner portion is slidable along the radial axis and replaceable with a replacement seal; and an annular ring engaging the dirt lip and the sealing portion such that a gap is formed between the annular ring and the inner portion between the dirt lip and the sealing portion wherein the annular ring is out of contact with the inner portion and such that the annular ring retains the inner portion onto the outer portion, the annular ring having an axis axially aligned with the radial axis.

2. The seal and shaft assembly according to claim 1, wherein the inner portion comprises a retaining channel extending along the radial axis.

3. The seal and shaft assembly according to claim 2, wherein the annular ring is disposed in the retaining channel.

4. The seal and shaft assembly according to claim 1, wherein the annular ring biases the inner portion onto the outer portion.

5. The seal and shaft assembly according to claim 1, wherein the free end of the outer portion is retained inside the groove by friction.

6. The seal and shaft assembly according to claim 1, wherein the shaft has a longitudinal axis and the free end extends along a free end axis parallel to the longitudinal axis.

7. The seal and shaft assembly according to claim 6, wherein the inner portion comprises an outer edge.

8. The seal and shaft assembly according to claim 6, wherein the annular ring extends around and engaging the outer edge.

9. The seal and shaft assembly according to claim 7, wherein the annular ring biases the outer edge against the free end.

10. A seal assembly for sealing a space between a shaft and a housing, the seal assembly comprising:
an outer portion connectable with the housing, the outer portion having:
an axial portion, the axial portion having a first end and a second end; and
a radial portion extending radially inwardly, the radial portion having a connected end extending radially from the first end of the axial portion and a free end, the radial portion having a radial axis;
an inner portion releasably attached to the free end of the outer portion, the inner portion having an annular groove sized to releasably accept the free end of the outer portion inserted thereinto, wherein the inner portion further comprises:
a dirt lip disposed radially proximate to the free end of the outer portion;
a contact portion disposed radially proximate to the second end of the axial portion; and
a retaining channel disposed between the dirt lip and the contact portion, wherein the retaining channel includes:
a first wall having a linear axial cross-section;
a second wall having a linear axial cross-section; and
a connecting wall connecting the first wall and the second wall, the connecting wall having a curved axial cross-section having a first radius of curvature;
a biasing member adapted to bias the contact portion radially inwardly; and
an annular ring disposed in the retaining channel, and in contact with the retaining channel along the first wall and the second wall such that a gap is present between the annular ring and at least a portion of the connecting wall such that the annular ring biases the inner portion against the outer portion.

11. The seal assembly according to claim 10, wherein the annular ring is biased radially outwardly.

12. The seal assembly according to claim 10, wherein the free end extends axially between the dirt lip and the contact point.

* * * * *